United States Patent [19]

Ladin

[11] 4,033,440

[45] July 5, 1977

[54] SELF-ALIGNING CLUTCH BEARING ASSEMBLY

[75] Inventor: Eli M. Ladin, Ann Arbor, Mich.

[73] Assignee: Federal-Mogul Corporation, Southfield, Mich.

[22] Filed: July 7, 1975

[21] Appl. No.: 593,627

Related U.S. Application Data

[62] Division of Ser. No. 427,486, Dec. 26, 1973, Pat. No. 3,931,875.

[52] U.S. Cl. .............................................. 192/98
[51] Int. Cl.² ........................................ F16D 23/14
[58] Field of Search .......................... 192/110 B, 98

[56] References Cited

UNITED STATES PATENTS

| | | | |
|---|---|---|---|
| 3,625,327 | 12/1971 | Birdsey | 192/98 |
| 3,741,361 | 6/1973 | Brandenstein | 192/98 |
| 3,805,934 | 4/1974 | Labadie | 192/98 |
| 3,900,091 | 8/1975 | Maucher | 192/98 |

FOREIGN PATENTS OR APPLICATIONS

| | | | |
|---|---|---|---|
| 1,810,787 | 7/1970 | Germany | 192/98 |

*Primary Examiner*—Benjamin W. Wyche
*Attorney, Agent, or Firm*—Harness, Dickey & Pierce

[57] ABSTRACT

A clutch release bearing wherein an annular wear plate is supported on the outer race structure of the bearing for limited displacement relative thereto by means of a resilient annular element. When the bearing is shifted axially of the clutch to uncouple driving and driven clutch members from each other, the wear plate contacts the release levers of the clutch at a location disposed radially displaced either inwardly or outwardly from the bulk of the resilient annular element. The bulk of the resilient annular element is also disposed axially between where it engages the annular wear plate and where it engages the outer race structure. In this way, the wear plate can assume a position wherein it generally uniformly engages all individual release levers of the clutch and with a minimum of relative movement occurring therebetween. Thus, the annular wear plate is considered self-aligning and provides a bearing construction which compensates for both out-of-square and eccentricity conditions which may exist. The annular wear plate may have an annular conical flange for engagement with the clutch release levers for increasing the tractive force between the clutch levers and wear plate which exists during conditions of eccentricity between the axis of the engine flywheel relative to the axis of the transmission input shaft.

3 Claims, 6 Drawing Figures

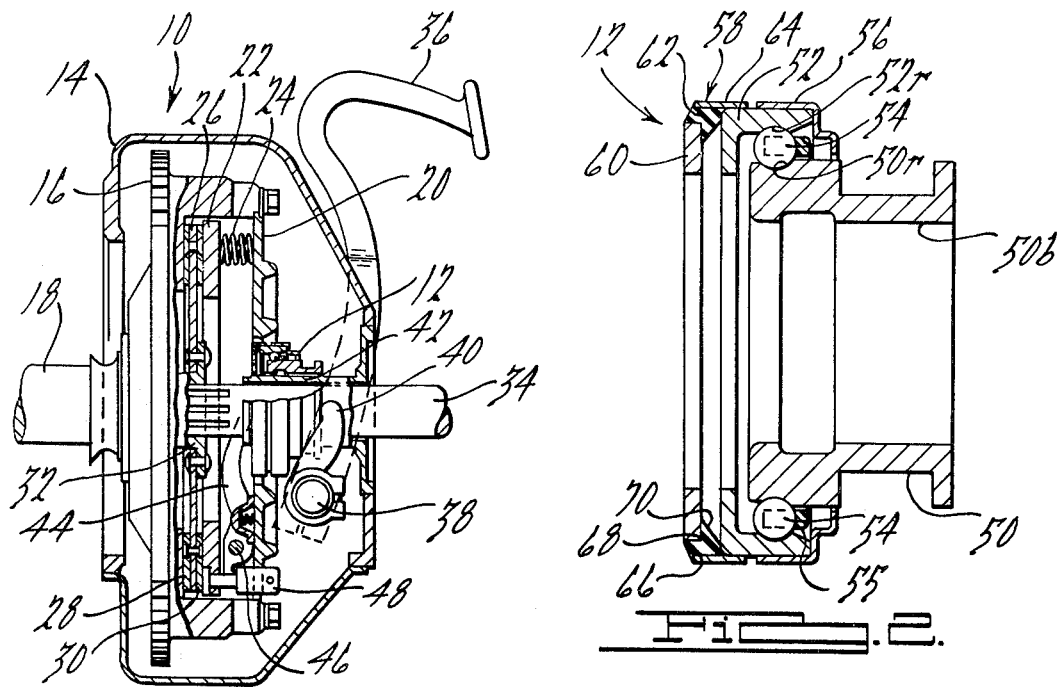
Fig. 1.
Fig. 2.
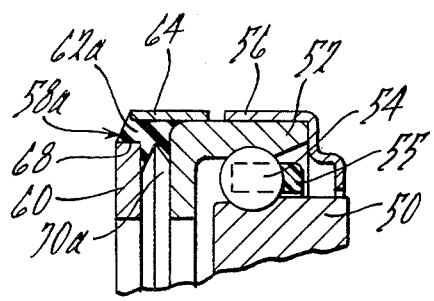
Fig. 4.
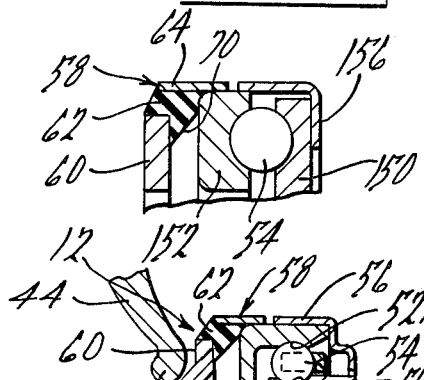
Fig. 3.
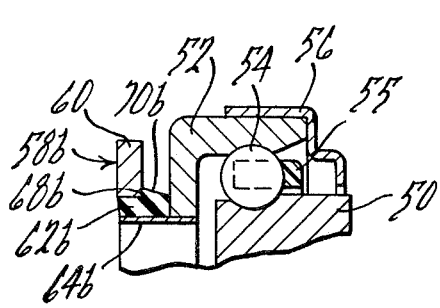
Fig. 5.
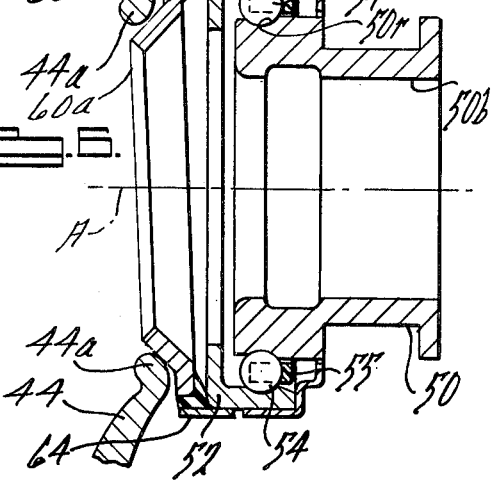
Fig. 6.

SELF-ALIGNING CLUTCH BEARING ASSEMBLY

This is a divison of application Ser. No. 427,486, filed Dec. 26, 1973, now U.S. Pat. No. 3,931,875 granted Jan. 13, 1976.

BACKGROUND AND SUMMARY OF THE INVENTION

The present invention is directed to bearing assemblies generally and in particular, to those of the type commonly used as clutch release bearings in automobile friction disc clutches.

Two common problems in the clutch release bearing art are: (1) eccentricity of the bearing axis (transmission input shaft axis) relative to the engine flywheel axis and (2) an out-of-square condition between the clutch release levers and the bearing. "Out-or-square" is a familiar term used in the art to describe a condition whereby the plane defined by the tip of the clutch release levers or fingers is not parallel to the plane of the bearing face which they engage. The first problem results in undue wear between both the bearing face and the tips of the clutch levers because of the reciprocating motion therebetween which takes place after engagement and prior to the bearing and clutch disc rotating as one unit. The second problem results in undue wear occurring on one particular clutch release lever during one particular clutch release. In other words, the entire axial load exerted while depressing theclutch, which is generally in the order of 500 pounds, is exerted by one clutch finger, or at any rate, less than all clutch fingers, and when this occurs, in an eccentrically mounted bearing assembly, the amount of wear caused by the reciprocating motion between that particualr clutch finger and the bearing face is significantly increased over what it would be were it not in the out-or-square condition. These two problems are the result of variations in tolerances arising from currently practiced manufacturing and assembly techniques for the complete clutch and transmissions, and it is not considered economically practical to try to further control these variances. My invention automatically compensates for these variances.

A description of the invention appears in the ensuing specification, including claims, which is to be taken in conjunction with the accompanying drawing. The drawing illustrates preferred embodiments of the invention in accordance with the best mode presently contemplated in carrying out the invention.

BRIEF DESCRIPTION OF THE DRAWINGS

FIG. 1 is a longitudinal sectional view having portions broken away through a conventional automotive type friction disc clutch assembly having a release bearing embodying principles of the present invention;

FIG. 2 is an enlarged longitudinal sectional view through the clutch release bearing of FIG. 1 shown by itself;

FIG. 3 is an enlarged fragmentary sectional view showing an additional embodiment;

FIG. 4 is a view similiar to FIG. 3 showing a still further embodiment;

FIG. 5 is a view similar to FIG. 3 showing a still further embodiment; and

FIG. 6 is a view similar to FIG. 2 illustrating yet another embodiment during actuation of the clutch.

DESCRIPTION OF THE PREFERRED EMBODIMENTS

FIG. 1 is a sectional view of a typical single disc friction clutch 10 having a self-aligning clutch release bearing 12 embodying the principles of the present invention. Briefly, clutch 10 has a housing 14 which encompasses flywheel 16 driven by input shaft 18, typically the engine crankshaft. A backing plate 20 is bolted to flywheel 16 and a pressure plate 22 is urged by a plurality of springs 24 (to the left as viewed in FIG. 1) to press a clutch disc 26 against flywheel 16. Disc 26 has annular facings 28 and 30 of a friction material on opposite sides thereof. A hub 32 is affixed to the inner periphery of disc 26 and is drivingly coupled via splines with an output or transmission shaft 34. When the clutch is in the engaged position shown in the drawing, flywheel 16, plate 20, 22, disc 26, hub 32 and shaft 34 rotate together when shaft 18 turns. A clutch pedal 36 is pivoted on a stub shaft 38 and an actuating fork 40 is also affixed to shaft 38. When pedal 36 is depressed, fork 40 shifts clutch release bearing 12 to the left as viewed in FIG. 1. Bearing 12 is mounted on a cylindrical sleeve 42 around shaft 34, although it could be mounted on shaft 34 directly if so desired. When bearing 12 is shifted to the left as viewed in FIG. 1, it engages release levers 44 which are pivoted as at 46 on backing plate 20. The opposite ends of levers 44 are arranged to engage bushings 48 which are affixed to pressure plate 22. With the release levers 44 pivoted by bearing 12, pressure plate 22 is shifted to the right as viewed in FIG. 1, thereby releasing disc 26 from the pressure applying relation with flywheel 16. With the exception of bearing 12, clutch 10 is of entirely conventional construction and merely illustrative of the types to which the present invention is applicable. Details of the novel clutch release bearing according to the present invention are disclosed best in FIGS. 2–6.

Therefore, turning first to FIG. 2, the clutch release bearing 12 comprises an inner race member 50 having a raceway 50r, an outer race member 52 having a raceway 52r, a plurality of anti-friction bearing elements 54 is the form of spherical balls riding in raceways 50r, 52r, a cage 55 for circumferentially spacing the balls, a retainer 56 and a novel self-aligning structure 58, which structure is composed of an annular wear plate 60, a resilient annular element 62 preferably of elastomeric type material and an annular collar 64. The components 50, 52, 54, 55, 56 are entirely conventional and may be made in accordance with well-known techniques. Attention is therefore focused on details of the novel self-aligning structure 58. It will be observed in FIG. 2 that collar 64 has the right-hand end thereof telescoped over the cylindrical outer surface of outer race member 52. This leaves the left-hand free end of collar 64 projecting axially beyond the end of outer race member 52. Wear plate 60 has circular inner and outer peripheries and the outer diameter thereof is substantially less than the inside diameter of collar 64. It will also be observed that wear plate 60 is spaced axially from the end of outer race member 52. The resilient annular element 62 may be considered generally as being somewhat conically shaped to support wear plate 60 generally radially inwardly and generally axially outwardly of the free end of collar 64. With this construction it will be noted that a substantial portion of the bulk of element 62 is located axially intermediate wear plate 60 and outer race member 52. Furthermore, the bearing is arranged such that the bulk of the element 62 is disposed radially beyond the point at which the clutch release levers 44 contact wear plate 60 when the bearing is shifted to disengage the clutch. (This will be explained later in connection with FIG. 6.) By virtue of this construction, the self-aligning characteristics of the bearing for compensating for the aforementioned accentricity and out-of-square conditions are greatly enhanced over prior art bearings. It is also preferable to provide in element 62 an annular groove 66 via which element 62 can mate with the free end of collar 64 and also an annular groove 68 via which the resilient element can mate with wear plate 60. It is also preferable to provide a portion of the resilient material directly axially between plate 60 and the outer race member 52, and as shown in FIG. 2, this portion is provided with a radially inwardly facing conical surface 70. By constructing and locating resilient element 62 in such manner relative to the wear plate 60, the wear plate 60 is in effect cantilevered and its position relative to the plane of the race member 52 is very flexible so that it can adapt to uneven engagement by out-of-square clutch levers. Element 62 may be bonded to wear plate 60 and collar 64 by suitable boding means.

FIGS. 3, 4 and 5 illustrate additional embodiments of the invention and like numerals are retained to designate like elements. In FIG. 3, the embodiment is identical to that of FIG. 2 insofar as the self-aligning structure 58 is concerned. However, it will be noted that the construction of the bearing elements 150, 152 and 156 is typical of a conventional thrust bearing which is also commonly used for clutch release applications.

FIG. 4 is like FIG. 2 except that the embodiment of FIG. 4 has a slightly different self-aligning structure 58a characterized by a different resilient element 62a. It will be noted that instead of the conically-shaped surface 70 provided in the embodiment of FIG. 2, that the embodiment of FIG. 4 is provided with a V-shaped groove 70a instead. This provides further advantageous and beneficial deflection characteristics.

The embodiment of FIG. 5 is the same as FIG. 2 except that a different self-aligning structure 58b is provided. Here instead of having collar 64 telescoped over the outer periphery of outer race member 52 as in FIG. 2, a smaller diameter collar 64b is fitted into the inner periphery of outer race member 52. The wear plate 60 is supported from the free end of collar 64b via a resilient annular element 62b which is lodged around collar 64b and against outer race member 52. A groove 68b is provided which mates with the inner periphery of wear plate 60. A section of the annular element 62b is disposed directly between wear plate 60 and outer race member 52 and has a radially outwardly facing cone surface 70b.

The embodiment of release bearing shown in FIG. 6 illustrates further aspect of the invention which provides even further advantages. (FIG. 6 illustrates the bearing assembly during actuation of the clutch release levers 44 and such actuation will be explained in the succeeding paragraph.) In the embodiment of FIG. 6, wear plate 60, instead of being a flat annular element lying entirely in a plane perpendicular to the bearing axis when the bearing is in the free state (as in the previous embodiments), is provided with an annular conical flange 60a extending around the inner periphery thereof. Flange 60a tapers radially inwardly in the direction facing away from the rest of the bearing. Flange 60a contributes to the self-aligning characteristics of the bearing assembly by providing in effect a mechanical interlock with the clutch release levers 44 when the bearing assembly is shifted axially. A bearing which includes flange 60a possesses even better self-aligning characteristics for more uniformly operating the release levers during actuation of the clutch and alleviating wear and tear on the bearing and release levers.

The operational advantages of the invention are best highlighted when considering operation of the clutch as illustrated in FIG. 6. (Note that the section in FIG. 6 is taken along planes passing through the release levers which are arranged circumferentially around the clutch axis.) The inner ends of levers 44 have balled sections 44a which are positioned to be contacted by wear plate 60 when bearing assembly 12 is shifted axially (to the left as viewed in FIG. 1) to disengage the clutch. When neither an out-of-square condition nor an eccentricity condition exists, flange 60 uniformly simultaneously contacts release levers 44 when the bearing is shifted. As the load imposed by release levers it taken by the bearing, resilient element 62 generally uniformly deforms slightly as wear plate 60 is displaced slightly toward the outer race member 52. Assuming an eccentric condition exists, because of misalignment of input and output shafts 18 and 34, the resilient nature of element 62 allows plate 60 to move about the axis of the bearing, and because of this movement, the relative movement between plate 60 and the clutch levers 44 is reduced. Generally, the type of movement between plate 60 and the axis of rotation of bearing 52 would be described as oscillatory, whereas the motion between the clutch levers at the plate 60 at the mutal point of contact is reciprocatory. Quite obviously the lineal extent of this "reciprocation" absent the improvement of my invention equals the amount of eccentricity between the input and output shaft axes. The "tractive" force which radially drives plate 60 is generally equal to the axial force exerted through clutch pedal 36 times the coefficient of friction between clutch levers and wear plate. In the embodiment of FIG. 6, I have increased the tractive force by provision of conical flange 60a which provides a radial component of force in addition to whatever force is provided by the presence of friction. Other means of increasing tractive force can also be provided, such as increasing the coefficient of friction of wear plate 60 by selection of material and/or surface finish.

In all embodiments shown, it will be understood that if there exists an out-of-square condition, the loading of clutch levers on the wear plate will be quickly evenly distributed the moment the leading clutch lever contacts the wear plate. This results from the fact that the wear plate is resiliently suspended, which allows it to be forced inwardly at that particular point of contact with the leading clutch finger and thereby brings the lagging clutch levers into engagement. This permits the remaining release levers to be engaged by the wear plate before any appreciable loading occurs between the bearing and the leading clutch lever.

All in all, the present invention provides important improvements in operational performance over prior art bearings. Furthermore, the invention can be practiced with maximum economy. As shown in the preferred embodiments of FIGS. 2–5, the wear plate is a flat annular piece; hence, it can be blanked and pierced from sheet material and this is far simpler than more complicated fabrication techniques required by prior art bearings. In FIG. 6, the conical flange 60a can be easily formed by stamping. The resilient element 62 and collar 64 may also be readily fabricated and the three elements 60, 62, 64 can be readily assembled together and mounted on outer race member 52.

It is understood that the foregoing description is that of a preferred embodiment of the invention. Various changes and modifications may be made without departing from the spirit and scope of the invention as defined by the appended claims.

What is claimed is:

1. In a bearing assembly having inner and outer race means and a plurality of anti-friction bearing elements constrained between said inner and outer race means, the invention wherein an annular wear plate having inner and outer peripheries is disposed substantially perpendicular and concentric to the axis of the bearing assembly and has one of its peripheries supported from said outer race means by a resilient annular element so as to permit limited deflection of said wear plate in a direction perpendicular to the axis of said bearing assembly and in directions angularly tilted with respect to the axis of said bearing assembly relative to said outer race means and thereby providing said bearing assembly with a self-aligning capability, said resilient annular element having inner and outer peripheries, one of said peripheries of said resilient annular element being affixed to said outer race means and the other periphery of said resilient annular element being affixed to one of the peripheries of said annular wear plate, the inner and outer peripheries of said resilient annular element being offset both radially and axially relative to each other with the bulk of said resilient annular element being disposed there between, said annular wear plate having an annular conical flange extending around the other periphery thereof.

2. The invention as claimed in claim 1 wherein said annular conical flange tapers radially inwardly in the direction away from said inner race means.

3. The invention as claimed in claim 1 wherein said annular conical flange extends around the inner periphery of said annular wear plate.

* * * * *